(12) United States Patent
Krüger et al.

(10) Patent No.: US 10,280,861 B2
(45) Date of Patent: May 7, 2019

(54) METHOD AND APPARATUS FOR MONITORING THE TEMPERATURE OF THE COIL WIRE OF A SOLENOID VALVE

(71) Applicant: CONTINENTAL AUTOMOTIVE GMBH, Hannover (DE)

(72) Inventors: Thomas Krüger, Themar (DE); Dmitriy Kogan, Roding (DE); Andreas Bodensteiner, Lappersdorf (DE)

(73) Assignee: CPT Group GmbH, Hannover (DE)

( * ) Notice: Subject to any disclaimer, the term of this patent is extended or adjusted under 35 U.S.C. 154(b) by 179 days.

(21) Appl. No.: 15/301,642

(22) PCT Filed: Mar. 12, 2015

(86) PCT No.: PCT/EP2015/055207
§ 371 (c)(1),
(2) Date: Dec. 13, 2016

(87) PCT Pub. No.: WO2015/150049
PCT Pub. Date: Oct. 8, 2015

(65) Prior Publication Data
US 2017/0101954 A1    Apr. 13, 2017

(30) Foreign Application Priority Data

Apr. 3, 2014  (DE) .................. 10 2014 206 353

(51) Int. Cl.
*F02D 41/20* (2006.01)
*G01K 7/36* (2006.01)
(52) U.S. Cl.
CPC .............. *F02D 41/20* (2013.01); *G01K 7/36* (2013.01); *F02D 2041/2027* (2013.01);
(Continued)

(58) Field of Classification Search
CPC ................. F02D 2041/2062; F02D 2041/2027
See application file for complete search history.

(56) References Cited

U.S. PATENT DOCUMENTS

| 6,363,895 B1 * | 4/2002 | Butzmann ............. F01L 9/04 |
| | | 123/90.11 |
| 2005/0264272 A1 | 12/2005 | Novak |

(Continued)

FOREIGN PATENT DOCUMENTS

| CN | 103328796 A | 9/2013 |
| CN | 103502614 A | 1/2014 |

(Continued)

OTHER PUBLICATIONS

German Office Action for corresponding German patent application No. 10 204 206 353.1 dated Jan. 23, 2015.
(Continued)

*Primary Examiner* — Hung Q Nguyen
*Assistant Examiner* — Xiao En Mo

(57) ABSTRACT

A method and an apparatus for monitoring a temperature of a coil wire of a solenoid valve are provides. An actuation signal has actuation intervals which follow one another is used in this case, wherein a start pulse, which causes an increase in current in the coil wire of the magnet coil and has a prespecified pulse duration, and a pulse sequence, which follows the start pulse and has a duty cycle, are provided in each actuation interval. The current intensity of the current flowing through the coil wire of the solenoid valve is measured at two different times during the increase in current, and the current gradient is subsequently calculated from the measured current intensities. A prespecified threshold value for the current gradient is then compared with the calculated current gradient.

7 Claims, 2 Drawing Sheets

(52) U.S. Cl.
CPC ............... *F02D 2041/2058* (2013.01); *F02D 2041/2065* (2013.01); *G01K 2205/00* (2013.01); *G01K 2217/00* (2013.01)

(56) References Cited

U.S. PATENT DOCUMENTS

| | | | | |
|---|---|---|---|---|
| 2014/0067233 A1* | 3/2014 | Nishida | ................... | F02D 41/20 701/103 |
| 2015/0040871 A1* | 2/2015 | Ravenda | ................. | F02D 41/20 123/490 |
| 2016/0281624 A1* | 9/2016 | Dames | ................... | F02D 41/40 |

FOREIGN PATENT DOCUMENTS

| | | |
|---|---|---|
| DE | 19522582 A1 | 12/1996 |
| DE | 19821804 C1 | 8/1999 |
| EP | 1596055 A1 | 11/2005 |
| EP | 1843028 A2 * | 10/2007 ............. F02D 41/20 |
| EP | 1903201 A2 | 3/2008 |
| EP | 2116709 A1 * | 11/2009 ............. F02D 41/20 |

OTHER PUBLICATIONS

International Search Report and Written Opinion dated Aug. 7, 2015 from corresponding International Patent Application No. PCT/EP2015/055207.
Korean Office action for corresponding Korean patent application 10-2016-7030772, dated Aug. 31, 2017.
Translation of International Preliminary Search Report on Patentability and Written opinion of the International Searching Authority, for PCT application PCT/EP2015/055207, dated Oct. 13, 2016.
Office Action, National Intellectual Property Administration, P.R. China, dated Oct. 22, 2018, for counterpart CN application 201580017961.6.

* cited by examiner

METHOD AND APPARATUS FOR MONITORING THE TEMPERATURE OF THE COIL WIRE OF A SOLENOID VALVE

TECHNICAL FIELD

The disclosure relates to a method and an apparatus for monitoring a temperature of a coil wire of a solenoid valve.

BACKGROUND

Solenoid valves are often used for regulating and controlling a volumetric flow, for example the fuel volumetric flow of a common-rail diesel injection system. During the operation of the solenoid valves, there is a risk that the temperature of the coil wire of the respective solenoid valve exceed a permissible maximum temperature. This may lead to a disturbance of the functioning of the solenoid valve and also to a destruction of the solenoid valve.

In order to avoid this, it is already known to measure a temperature value characterizing the coil temperature by means of a temperature sensor fitted on the housing of the coil of the solenoid valve.

However, one disadvantage of this procedure is that the temperature measured by a temperature sensor fitted on the housing of the solenoid valve does not correspond to the actual temperature of the coil wire. Instead, the temperature measures corresponds at most to an approximated value of the actual coil temperature.

SUMMARY

As such, it is desirable to have a method and apparatus for monitoring the temperature of a coil wire of a solenoid valve in which the actual temperature of the coil wire may be detected better than in known methods.

One aspect of the disclosure provides a method and apparatus configured to measure the temperature of the coil wire of a solenoid valve by evaluating an actuation signal having successive actuation intervals, wherein a start pulse having a predefined pulse duration, the start pulse bringing about a current rise in the coil wire of the magnet coil, and a pulse sequence succeeding the start pulse and having a duty ratio are provided in each actuation interval. This involves measuring the current intensity of the current flowing through the coil wire of the solenoid valve at a first point in time during the duration of the current rise, measuring the current intensity of the current flowing through the coil wire of the solenoid valve at a second point in time during the duration of the current rise, calculating the current gradient from the measured current intensities, comparing a predefined threshold value for the current gradient with the calculated current gradient, and reducing the current flowing through the coil wire if the calculated current gradient is less than the predefined current gradient.

Implementations of the disclosure may include one or more of the following optional features. In some implementations, reducing the current flowing through the coil wire in this way may be performed in a simple manner by changing the duty ratio of the pulses of the pulse sequence or by changing the number of pulses of the pulse sequence.

As such, the method and apparatus allow the coil wire temperature to be detected directly and thus more accurately than in known methods in which the coil wire temperature is detected by means of a temperature sensor fitted on the coil housing. By applying the method according to the disclosure, a critical limit temperature of the coil wire is prevented from being exceeded and the function of the solenoid valve is thus always ensured.

Additionally, the the technical outlay for carrying out the method is reduced as compared with known methods. The number of components needed is reduced in comparison with known methods in which temperature sensors are used. In this regard, in particular the need for a temperature sensor and also the need for electrical lines and plug connections by means of which the temperature sensor must be connected to an evaluation unit are obviated. In the method according to the disclosure, monitoring the temperature of the coil wire of a solenoid valve may be effected using the actuation equipment of the solenoid valve that is present anyway.

Furthermore, the method according to the disclosure has a higher reliability than the known methods in which temperature sensors are used, since the need for the additional components mentioned above is obviated and, consequently, the failure probability of the entire system is reduced.

A further advantage of the method according to the disclosure is that the reaction time to a change in the temperature of the coil wire that occurs during the operation of the solenoid valve is reduced.

Furthermore, costs are saved by obviating the need for the additional components mentioned above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
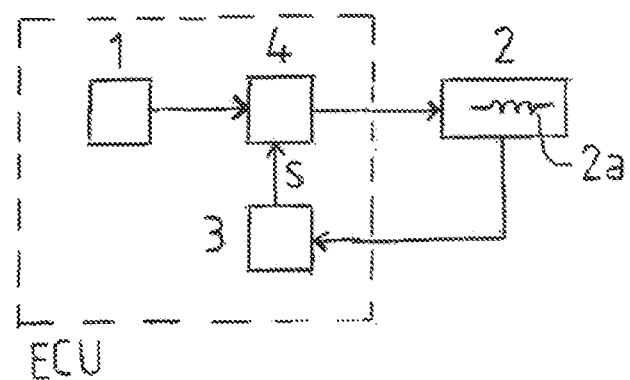
FIG. 1 is a schematic block diagram of an exemplary apparatus for monitoring the temperature of the coil wire of a solenoid valve.

FIG. 1 shows a block illustration of an apparatus for monitoring the temperature of a coil wire of a solenoid valve. The apparatus includes a voltage source 1, a solenoid valve 2, a control and regulating unit 3 and a switch 4. The voltage source 1, the control and regulating unit 3 and the switch 4 form an electronic control unit ECU.

The voltage source 1 provides a DC voltage at its output, the DC voltage causing a current flow through the magnet coil 2a of the solenoid valve 2 via the switch 4. The current flowing through the solenoid valve 2 is fed to the control and regulating unit 3, in which the current is measured, the current gradient is calculated and the calculated current gradient is evaluated. The control and regulating unit 3, which includes a microcomputer, makes available at its output a switch control signal s, by means of which the switch 4 is actuated. The actuation of the switch 4 is effected by means of an actuation signal, which is explained in greater detail below with reference to the further FIGS.

The apparatus described above is used in the present disclosure for carrying out a method for monitoring the temperature of the coil wire 2a of the magnet coil 2.

Figure 2:
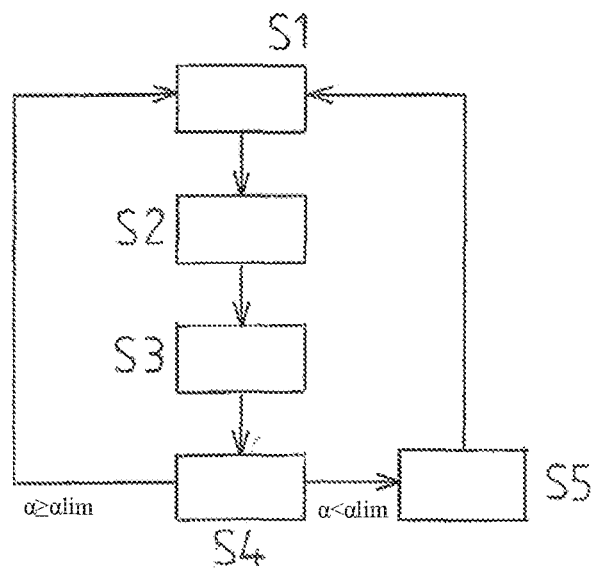
FIG. 2 is a schematic exemplary flow diagram for elucidating a method for monitoring the temperature of the coil wire of a solenoid valve.

FIG. 2 shows a flow diagram for elucidating the method for monitoring the temperature of the coil wire of the magnet coil of a solenoid valve. This method uses an actuation signal having successive actuation intervals. A start pulse having a predefined pulse duration, the start pulse bringing about a current rise in the coil wire of the magnet coil, and a pulse sequence succeeding the start pulse and having a duty ratio are provided in each of the actuation intervals.

A step S1 involves measuring the current intensity I(t1) of the current flowing through the coil wire of the solenoid valve at a first point in time t1 during the current rise.

Afterward, a step S2 involves measuring the current intensity I(t2) of the current flowing through the coil wire of the solenoid valve at a second point in time t2 during the current rise.

Then, a step S3 involves calculating the current gradient α according to the following relationship:

$$\alpha = \frac{[I(t2) - I(t1)]}{(t2 - t1)} \quad \text{(EQ. 1)}$$

A transition is then made to a step S4, in which a predefined threshold value αlim for the current gradient is compared with the calculated current gradient α.

If this comparison reveals that the calculated threshold value α is less than the predefined threshold value αlim, then a transition is made to a step S5, which involves reducing the current flowing through the coil wire 2a of the magnet coil 2. Reducing the current flowing through the coil wire in this way can advantageously be performed by changing the switch control signal s fed to the switch 4 in the sense of changing the duty ratio of the pulses of the pulse sequence of the respective actuation interval. As an alternative thereto, reducing the current flowing through the coil wire in this way may also be performed by changing the number of pulses of the pulse sequence of the respective actuation interval.

Reducing the current flowing through the coil wire of the solenoid valve in this way in step S5 is followed by a return to step S1, such that steps S1 to S5 may be carried out again in a subsequent actuation interval.

By contrast, if the comparison carried out in step S4 reveals that the calculated current gradient α is greater than the predefined threshold value αlim or equal to the predefined threshold value αlim, then proceeding from step S4 a direct return to step S1 is effected, such that steps S1 to S5 may be carried out again in a subsequent actuation interval.

The method and apparatus makes use of the fact that the current gradient decreases as the temperature of the coil wire increases. The predefined threshold value αlim for the current gradient is therefore predefined in such a way that, during the operation of the solenoid valve, it is always ensured that a permissible maximum temperature of the coil wire of the magnet coil is not exceeded. This prevents overheating of the coil wire and also destruction of the magnet coil on account of overheating of the coil wire.

Figure 3:
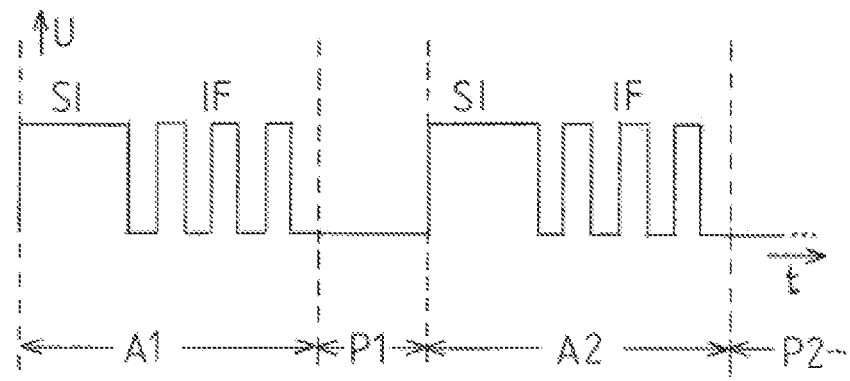
FIG. 3 is a schematic a schematic diagram of an exemplary actuation signal used in a method according to the disclosure.

FIG. 3 shows a schematic diagram of one exemplary embodiment of the actuation signal used in the method according to the disclosure. In the schematic diagram, the voltage U is plotted upward and time t is plotted toward the right. It is evident that the actuation signal used has a plurality of actuation intervals A1, A2, ..., which are respectively spaced apart from one another by a pause interval P1, P2, .... A start pulse SI, which brings about a current rise in the coil wire of the magnet coil, is provided in each of the actuation intervals. Furthermore, a pulse sequence IF succeeding the start pulse and having a duty ratio is provided in each of the actuation intervals. The pulse duration of the start pulse SI is greater than the pulse duration of the pulses of the pulse sequence IF. If the above-described evaluation of the current gradient reveals that the calculated current gradient is less than the predefined threshold value for the current gradient, then the duty ratio of the pulses of the pulse sequence IF may be changed for the purpose of reducing the current flowing through the coil wire 2a of the magnet coil 2. As an alternative thereto, the number of pulses of the pulse sequence IF may also be changed for the purpose of reducing the current flowing through the coil wire 2a of the magnet coil 2. This leads to a change in the duration of the respective pause interval and also to a change in the duration of an actuation interval.

Figure 4:
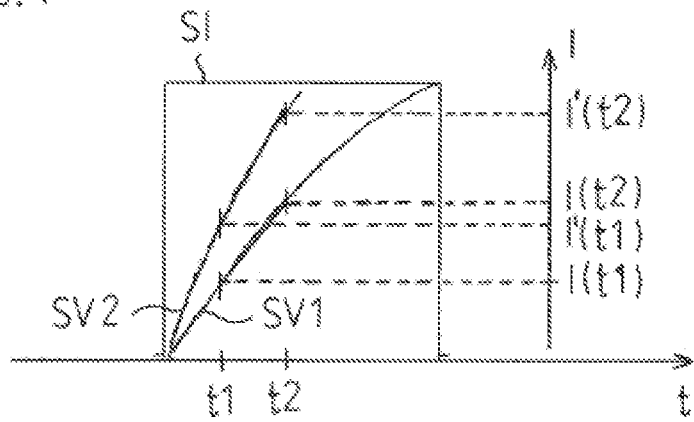
FIG. 4 is an exemplary schematic diagram for elucidating various current gradients.

FIG. 4 shows a schematic diagram for elucidating various current gradients. In this case, the start pulse SI of an actuation interval is illustrated in an enlarged manner in FIG. 4. Two different current profiles SV1 and SV2 are illustrated within the start pulse. The progression of the current profile SV1 is flatter than the current profile SV2. Consequently, the current gradient associated with the current profile SV1, α1=[I(t2)−I(t1)]/(t2 −t1), is less than the current gradient associated with the current profile SV2, α1=[I'(t2)−I'(t1)]/(t2−t1).

A number of implementations have been described. Nevertheless, it will be understood that various modifications may be made without departing from the spirit and scope of the disclosure. Accordingly, other implementations are within the scope of the following claims.

What is claimed is:
1. A method for monitoring a temperature of a coil wire of a solenoid valve using an actuation signal, the method comprising the following steps:
   providing a voltage source configured to provide current at an output;
   providing a switch connected to the output of the voltage source;
   providing a solenoid valve connected to the switch and configured to receive the current from the voltage source, the solenoid valve comprising the coil wire;
   providing a control and regulating unit configured to receive the current from the coil wire and output a switch actuation signal having successive actuation intervals for controlling the switch, each actuation interval includes a start pulse and a pulse sequence succeeding the start pulse, the start pulse having a predefined pulse duration and bringing about a current rise in the coil wire, the pulse sequence having a duty ratio;
   S1: measuring, at the control and regulating unit, a first current intensity of the current flowing through the coil wire of the solenoid valve at a first point in time during the current rise;
   S2: measuring, at the control and regulating unit, a second current intensity of the current flowing through the coil wire of the solenoid valve at a second point in time during the current rise;
   S3: calculating, at the control and regulating unit, a current gradient from the measured first and second current intensities;

S4: comparing, at the control and regulating unit, a predefined threshold value for the current gradient with the calculated current gradient; and S5: reducing the current flowing through the coil wire if the calculated current gradient is less than a predefined current gradient.

2. The method of claim 1, further comprising repeating steps S1 to S5 in successive actuation intervals.

3. The method of claim 1, wherein the pulse duration of the start pulse is greater than the pulse duration of a pulse of the pulse sequence.

4. The method of claim 1, wherein reducing the current flowing through the coil wire is performed by changing the duty ratio of the pulses of the pulse sequence having a duty ratio.

5. The method of claim 1, wherein reducing the current flowing through the coil wire is performed by changing the number of pulses of the pulse sequences having a duty ratio.

6. The method of claim 1, wherein the successive actuation intervals are spaced apart from one another in each case by a pause interval.

7. An apparatus for monitoring the temperature of a coil wire of a solenoid valve, the apparatus comprising:
a voltage source outputting a current at an output;
a solenoid valve comprising the coil wire;
a switch connected to the output of the voltage source and providing the current to the coil wire; and
a control and regulating unit receiving the current from the coil wire, the control and regulating unit configured to:
output a switch actuation signal having successive actuation intervals for controlling the switch, each actuation interval includes a start pulse and a pulse sequence succeeding the start pulse, the start pulse having a predefined pulse duration and bringing about a current rise in the coil wire, the pulse sequence having a duty ratio;
measure a first current intensity of the current flowing through the coil wire of the solenoid valve at a first point in time during the current rise;
measure a second current intensity of the current flowing through the coil wire of the solenoid valve at a second point in time during the current rise;
calculate a current gradient from the first and second measured current intensities;
compare a predefined threshold value for the current gradient with the calculated current gradient; and
reduce the current flowing through the coil wire if the calculated current gradient is less than a predefined current gradient.

* * * * *